United States Patent [19]
Semar et al.

[11] Patent Number: 5,922,271
[45] Date of Patent: Jul. 13, 1999

[54] METHOD FOR THE MANUFACTURE OF DENSE-SINTERED GLASS CERAMIC MOLDINGS

[75] Inventors: Wolfgang Semar, Mainz; Janusz Zborowski, Ingelheim; Wolfgang Pannhorst, Mainz; Waldemar Weinberg, Seibersbach; Klaus Mirsch, Mainz; Michael Dunkl, Oppenheim; Bartolome Aloy, Mainz; Werner Waidhas, Mainz; Monika Bürkner, Mainz, all of Germany

[73] Assignee: Schott Glaswerke, Mainz, Germany

[21] Appl. No.: 08/868,578

[22] Filed: Jun. 4, 1997

[30] Foreign Application Priority Data

Jun. 5, 1996 [DE] Germany ............... 196 22 522

[51] Int. Cl.$^6$ .................................................. B28B 1/26
[52] U.S. Cl. .................................. 264/602; 264/651
[58] Field of Search ........................ 264/602, 651

[56] References Cited

U.S. PATENT DOCUMENTS

| 3,582,385 | 6/1971 | Duke et al. |
|---|---|---|
| 3,600,204 | 8/1971 | Beall et al. |
| 3,715,220 | 2/1973 | Confer et al. .................. 106/39 |
| 3,732,116 | 5/1973 | Reade. |
| 3,816,704 | 6/1974 | Borom et al. .................. 219/462 |

FOREIGN PATENT DOCUMENTS

390 397 A2  10/1990  European Pat. Off. ........ C03C 1/00

*Primary Examiner*—Christopher A. Fiorilla
*Attorney, Agent, or Firm*—Kilpatrick Stockton LLP

[57] ABSTRACT

A method for the manufacture of dense-sintered glass-ceramic shaped objects which have a coefficient of thermal expansion, $\alpha$, of $-0.5 \times 10^{-6}$/K to $1.8 \times 10^{-6}$/K in the range between 20° C. and 700° C. whereby ceramizable glass powder and/or glass-ceramic powder from the system $Li_2O$-$Al_2O_3$-$SiO_2$ is slip-cast by means of porous molds, dried, pretempered if necessary at temperatures up to 600° C., vitrified and then sintered until the sintering temperature is reached up to relative densities of greater than 0.96 and ceramized, and whereby the glass powder and/or the glass ceramic-powder is prepared in a first grain size fraction of less than 63 μm, in particular less than 45 μm, and in a second grain size fraction of less than 7 μm, in a ratio of the fractions to one another between 2:1 and 4:1, to form a stable, pourable slurry. The method can be used for the manufacture of industrial ceramics, but also for the manufacture of complex-shaped, large-volume and thin-walled hollow containers, in particular for use as cooking utensils which are resistant to thermal shock, as well as for dinnerware, solid ceramic castings and composites.

24 Claims, 4 Drawing Sheets

METHOD FOR THE MANUFACTURE OF DENSE-SINTERED GLASS CERAMIC MOLDINGS

BACKGROUND OF THE INVENTION

The invention relates to a method for the manufacture of dense-sintered glass-ceramic moldings and glass-ceramic moldings manufactured according to said method, having a coefficient of thermal expansion α, of $-0.5 \times 10^{-6}$/K to $1.8 \times 10^{-6}$/K in the temperature range between 20 and 700° C., whereby finely divided ceramizable glass and/or glass-ceramic powder from the system $Li_2O$ - $Al_2O_3$-$SiO_2$ in the slurry is molded by means of porous molds into green bodies, dried and then sintered and ceramized at temperatures of 700° C. and above until reaching the sintering temperature up to relative densities of greater than 0.96. The invention also relates to the use of the shaped bodies manufactured according to the method.

When molten glass is cooled below the melting point of the crystals of identical composition, glasses are in the state of a supercooled liquid. The fact that the crystallization does not occur, is due primarily to the fact that the crystal growth, which is controlled by the diffusion of the components, proceeds much too slowly as a result of the viscosity of the molten glass, which increases rapidly with decreasing temperature, or the number of nuclei from which the crystallites (smallest particles in which the crystal structure can be identified), is too low. In glass-ceramics, on the other hand, the crystallite formation in suitable glass systems is stimulated to obtain materials which have certain characteristics.

The starting point for the manufacture of glass-ceramics is a molten glass from which first the desired objects are shaped, e.g. by pressing, blowing, rolling or casting. Sub-microscopically fine crystallites are then formed during a subsequent heat treatment based on a precisely determined temperature-time curve. A prerequisite for the formation of such crystallites is the addition of substances which have a high melting point (generally $TiO_2$ and $ZrO_2$) to the molten glass, which particles, when they are precipitated as nucleating agents, initiate the crystallization. It is thereby essential that the temperature range of the maximum nucleation frequency is below the temperature range of the maximum crystal growth rate; in that case, the glass cannot crystallize during cooling, as long as there are no nuclei. Only when these nuclei have been formed in sufficient numbers in the temperature range of the maximum nucleation frequency can the desired tiny crystallites be obtained in a large number (up to $10^{17}$/cm$^3$) when reheated to the temperature of the maximum crystal growth rate. The crystal concentration in the volume can ultimately be 50–90%, depending on the desired characteristics of the finished product.

The importance of glass-ceramics for industrial applications is that their characteristics are determined not only by the vitreous ingredients, but also to a decisive extent by the types of crystals formed. In some particularly important systems, crystal phases are formed which have very low or even negative coefficients of thermal expansion (e.g. lithium-alumo-silicate). Using these systems, it is possible to create materials which experience almost zero expansion over a wide temperature range, retain their shape up to temperatures of approximately 800° C. and are altogether insensitive to rapid changes in temperature. Such materials can therefore be used, for example, for cooktops, glass cooking utensils, telescope mirror mounts, measurement standards etc.

Hollow glass and glass for cookware and dinnerware can also be manufactured from glass-ceramics. The products from this group, which were first marketed under the trade name PYROFLAM® (Corning), opak and JENA 2000® (Schott) are transparent, and are also characterized by an coefficient of thermal expansion which is approximately zero. They can therefore be exposed to extremely rapid changes in temperature, e.g. they can be taken from a freezer and placed on a hot cooktop. The opaque glass-ceramics bear a visual resemblance to porcelain, which is the result of a coarser growth of the microcrystallites in the ceramization process.

While the molding of bowls, pans etc. previously used the press method exclusively, recent developments have made it possible to use the blowing method to shape glass- ceramic melts which are inherently difficult to process. It has thereby become possible to include thin-walled glass containers in the line of glass-ceramics products for domestic items, including decorated glass objects which are fully resistant to high temperatures and the thermal shocks caused by severe, sudden changes in temperature.

U.S. Pat. No. 3,600,204 discloses a crystalline ceramic object which has a coefficient of thermal expansion between $0-15 \times 10^{-7}$/° C. in the range from 0° C. to 1000° C. and excellent dimensional stability at temperatures up to 900° C., which consists of crystals which all have a diameter of less than 10 microns, and which are distributed in a vitreous matrix. The crystalline fraction thereby amounts to at least 90 wt. % of the object, and consists exclusively of β-spodumene solid solution containing up to 15 wt. % mullite. The crystals are formed "in situ" from a glass composition (in wt. % on an oxide basis) which contains 3.5–7.5% $Li_2O$, 15–30% $Al_2O_3$ and 65–80% $SiO_2$, whereby the molar ratio of $Al_2O_3$:$LiO_2$ is between 1.0 and 1.5, and the sum of $Li_2O$, $Al_2O_3$ and $SiO_2$ makes up at least 98% of the total composition.

The object of U.S. Pat. No. 3,600,204 is to create a ceramic material which has excellent resistance to thermal shock and excellent dimensional stability, even under conditions of long-term use at temperatures up to 900° C., primarily for heat exchangers.

U.S. Pat. No. 3,715,220 describes a ceramic object which consists of a mixture of sintered, solidified particles, up to 100 wt. % of which are less than 4 mesh. The object is characterized by a coefficient of thermal expansion of $0\pm1 \times 10^{-7}$/°C., in the temperature range between 5° C. and 35° C., by an open porosity of less than 1%, and by finely-divided inorganic crystals as the dominant components, distributed in a vitreous matrix.

The mixture of the particles thereby consists of two different glass materials:

45–50 wt. % of a first finely-divided glass material which contains (in wt. % on an oxide basis) 70–74% $SiO_2$, 22–24% $Al_2O_3$, 4–6% $Li_2O$ and 0–2% other oxides, with a molar ratio of $Al_2O_3$:$Li_2O$ of not more than 1.5, and 45–55 wt. % of a second finely-divided glass material which contains (in wt. % on an oxide basis) 68–72% $SiO_2$, 17–19% $Al_2O_3$, 4–6% $TiO_2$, 2–24% $Li_2O$, whereby the sum of $SiO_2$, $Al_2O_3$, $TiO_2$ and $Li_2O$ makes up 95% of the glass composition of the second material, along with 2–4% MgO, 0–2% ZnO and 0–2% other oxides.

From this mixture of two different glass materials which are prepared together in a mill to form a grain size fraction which has a typical grain size distribution, a green molding is manufactured and subjected to the following thermal treatment:

heating from room temperature to approximately 1020°–1080° C.

holding at 1020°–1080° C. for at least 30 minutes further heating from 1020°–1080° C. to 1150°–1210 C.

holding at 1150°–1210° C. for at least 30 minutes further heating from 1150°–1210° C. to 1250°–1270° C.

holding at 1250°–1270° C. for at least one hour, followed by cooling to room temperature.

The object of U.S. Pat. No. 3,715,220 is to use conventional shaping methods such as slurry casting, pressing, isostatic pressing, extrusion techniques, injection molding and similar processes to manufacture green moldings, and to carry out a thermal treatment so that dimensionally-stable materials are obtained which do not experience thermal expansion and can be used, for example, for cooktops, optical instruments, telescope mirror mounts and similar applications.

SUMMARY OF THE PRESENT INVENTION

The object of the present invention is to create a method for the manufacture of dense-sintered $Li_2O$ - $Al_2O_3$ - $SiO_2$ glass-ceramics which have a relative density greater than or equal to 0.96. The method can thereby be used to manufacture hollow containers, even those which have complex shaped objects, large volumes and thin walls, in particular for freezer-to-oven cookware, and also for dinnerware and solid ceramic castings.

DETAILED DESCRIPTION

The object of the present invention can be accomplished if the glass and/or the glass-ceramics are prepared in a first grain size fraction of at least 90% less than 63 μm, in particular less than 45 μm, and in a second grain size fraction less than 7 μm, in a ratio of the fractions to one another between 2:1 and 4:1, in particular of 3:1, to form a stable, pourable slurry which contains up to 85% solids.

The slurry can thereby be prepared so that it is stable and pourable without the addition of any organic and/or inorganic additives.

The method taught by the invention uses a ceramizable glass and/or a glass-ceramic material with a composition range (in wt. % based on oxides) of:

| | | | |
|---|---|---|---|
| $Li_2O$ | 2.0 | — | 6.0 |
| $Na_2O$ | 0 | — | 4.0 |
| $K_2O$ | 0 | — | 4.0 |
| $\Sigma Na_2O+K_2O$ | 0 | — | 4.0 |
| MgO | 0 | — | 3.0 |
| ZnO | 0 | — | 4.0 |
| CaO | 0 | — | 1.0 |
| SrO | 0 | — | 2.0 |
| BaO | 0 | — | 3.5 |
| $Al_2O_3$ | 17 | — | 28 |
| $SiO_2$ | 50 | — | 75 |
| $TiO_2$ | 0 | — | 7.0 |
| $ZrO_2$ | 0 | — | 3.5 |
| $SnO_2$ | 0 | — | 2.0 |
| $\Sigma TiO_2 + ZrO_2 + SnO_2$ | 2.0 | — | 7.0 |
| $P_2O_5$ | 0 | — | 8.0 | and coloring components such as $V_2O_5$ 0–2.0, $Cr_2O_3$ 0–2.0, $MnO_2$ 0–2.0, $Fe_2O_3$ 0–2.0, CoO 0–2.0, and NiO 0–2.0.

An essential crystal phase in the form of high-quartz mixed crystals (HQMC) can be created with a glass ceramic sintered at up to 900° C. and with a heat-expansion coefficient α of $0.0 \pm 0.5 \cdot 10^{-6}/K$ at 20 to 700° C. With a glass ceramic sintered at up to 1200° C. and with a heat-expansion coefficient α, of $0.0 \pm 0.5 \cdot 10^{-6}/K$ to $1.8 \cdot 10^{-6}/K$ at 20 to 700° C., an essential crystal phase in the form of keatite mixed crystals can be created.

The green compact in one preferred embodiment of the present invention is, subsequent to drying and prior to sintering and/or ceramizing, heated to 500° C., maintained for a while, preliminarily tempered at up to 600° C., and then glazed with a glazing slurry.

In another embodiment, up to 100% of the portion of the ceramizable glass in the fraction consisting of at least 90% of particles less than 63 μm in size is replaced with already ceramized powder with the same range of chemical composition.

The advantage of this procedure is that the tendency to deform of larger articles, especially articles of a complicated shape, can be diminished or eliminated.

It is, however, also possible and sensible to likewise replace with already ceramized powder up to 100% of the portion of ceramizable glass in the fraction consisting of particles less than 7 μm in size when a very large and/or thin-walled hollow container is to be manufactured, to prevent it from contracting or deforming out of control when fired.

When powders of an already ceramized glass ceramic that exhibit keatite mixed crystals are to be employed along with fine particles of ceramizable glass to prepare the slurry, essential crystal phases in the form of high-quartz and keatite mixed crystals can be created jointly in the sintered glass ceramic subsequent to sintering and ceramizing at up to 900° C.

The mixture of translucent high-quartz mixed crystals and opaque can also be very decorative.

Using an already ceramized material leads of course to higher heat-expansion coefficients α in that the sintering must be carried out at higher temperatures, especially at temperatures higher than 1100° C., resulting in the formation of a keatite mixed-crystal phase.

Tests have indicated that adding an already ceramized powder to both fractions simultaneously helps to ensure dimensional stability during firing.

The slurry is prepared in the method in accordance with the present invention from starting materials in the form of an aqueous suspension of the to some extent wet-milled particle-size fractions. The water content of the slurry is reduced to less than 23% and preferably to 17.5–18.5%.

It is alternatively possible to prepare the slurry by wet-milling one of the particle-size fractions, especially the fraction consisting of particles less than 7 μm in size, drying and especially freeze-drying it, and adding it dry to the other starting component.

When the slurry is ready to pour, it is poured into porous casts.

Body depends here on the wetable cast's capillary capacity to suck water out of the slurry. Particles of slurry accumulate on the inner surface as the suction continues and interferes with the further transport of water. The time taken to achieve a commercially viable body is called bodying time. It should be as brief as possible. It can be minimized by varying the level of liquefaction, carefully controlling the flow of the portion with the smallest particles, and adding a little synthetic stiffener, molten-alumina cement etc., for instance.

Plaster based on an α+β hemihydrate (35–65% a hemihydrate) is an economical material for the cast. The pores in plaster casts range in size from 0.1 to 1 μm, which is beneficial at a pore volume of 50%.

The driving force behind bodying is the capillary action involved in filling the system of slender capillaries between the needle-shaped crystals of the plaster cast. This procedure can also be formally described as diffusion.

If the product is to be glazed, the green compact is removed from the cast, dried, and preliminarily tempered at up to 600° C.

The glazing slurry employed for this purpose in accordance with the present invention is preferably produced from a wet-milled and then dried and powdered fraction with particles smaller than 5 μm by adding demineralized water at a ratio of 50 to 50 by weight.

The optionally preliminarily fired and glazed compact is subjected to a sequence of firings whereby it is heated from room temperature to 500° C. at approximately 5K a min$^{-1}$, maintained at that temperature approximately 60 minute, heated to 750° C. at 1–5K a minute, immediately heated to 815° C. at 0.5–1K a min$^{-1}$, maintained at that temperature approximately 60 minutes, heated to 1200° C. at 3–5K a min$^{-1}$, and maintained at that temperature approximately 60 minutes, being accordingly sintered and thoroughly ceramized.

Still another component, especially a metal or metal-containing component, can easily be mixed into the slurry in accordance with the present invention, especially in the form of a pigment, to produce particular desired colors, marbleization, or physical properties like sensitivity to magnetism, induction, or radiation of specific wavelengths.

The third component can be homogeneously distributed throughout the already prepared slurry, providing every point in the final product with the same properties. The third component can be added to either the first or the second fraction, depending on its range of particle size.

The compact in accordance with the present invention can relatively easily be rendered inhomogeneous, laminar, and/or stratiform and provided with local variations in color and/or other properties by using at least two different slurrys.

Appropriate conventional glazes with a coefficient of expansion compatible with that of the compact itself can also be applied to compacts produced by the method hereintofore described.

The method in accordance with the present invention will now be specified with reference to two examples.

EXAMPLE 1

1. Preparing the Slurry

Two fractions are prepared by combining the glass powder with completely demineralized water. Fraction 1 comprises particles less than 63 μm in size. Fraction 2 comprises particles less than 7 μm in size.

Figure 1:
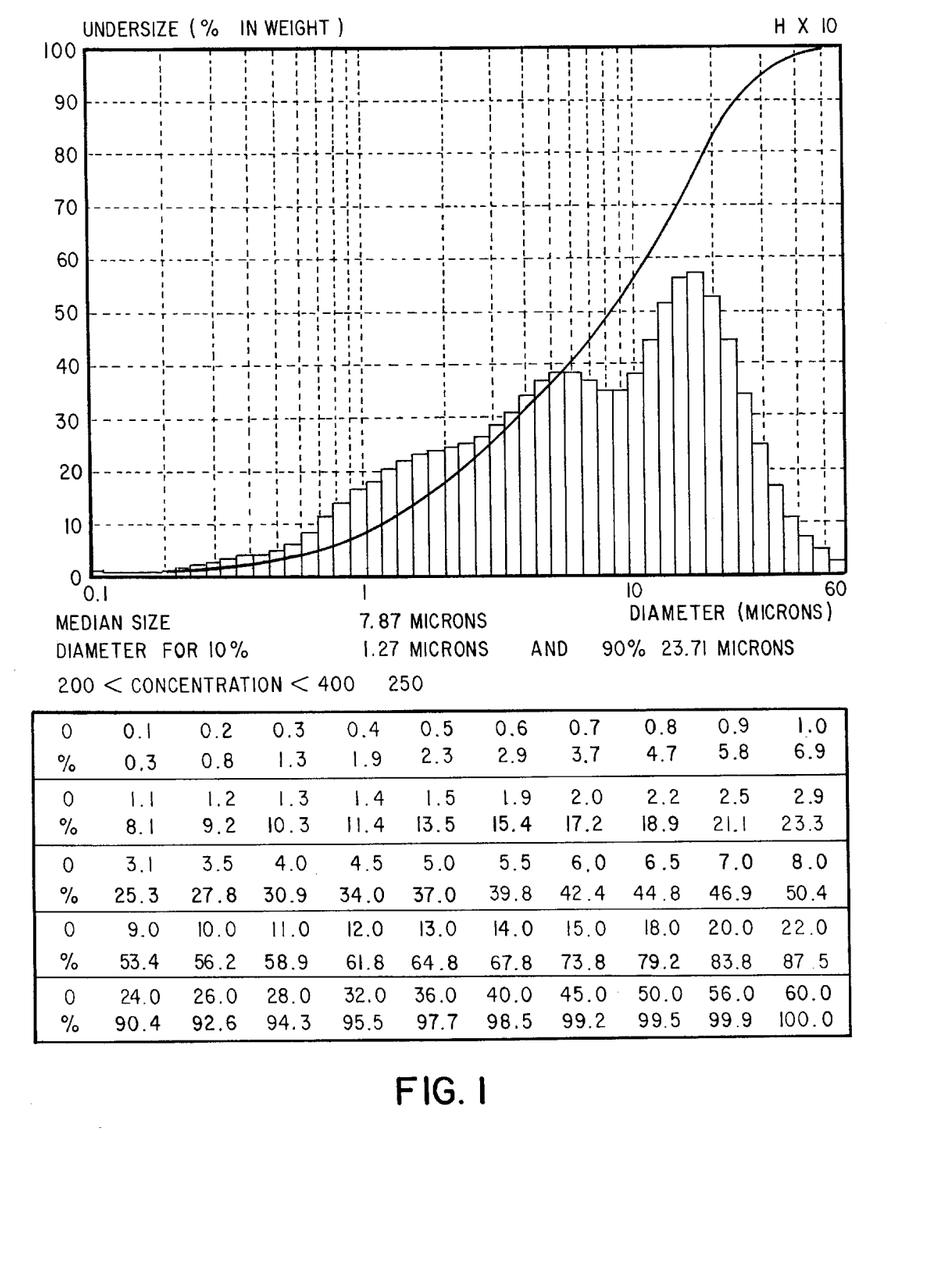
FIG. 1 is a chart illustrating particle size distribution.
Figure 2:
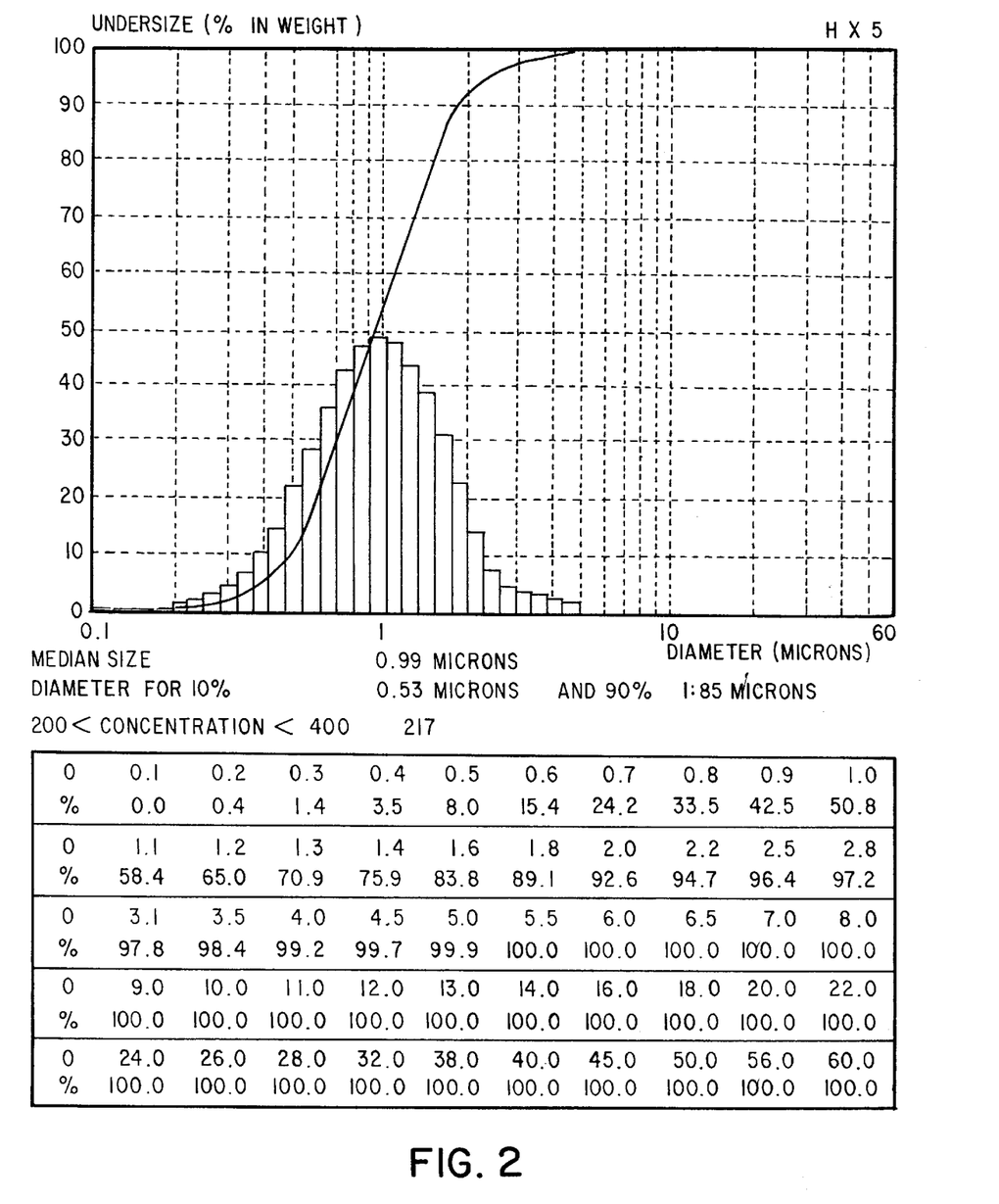
FIG. 2 is another chart illustrating particle size distribution.
Figure 3:
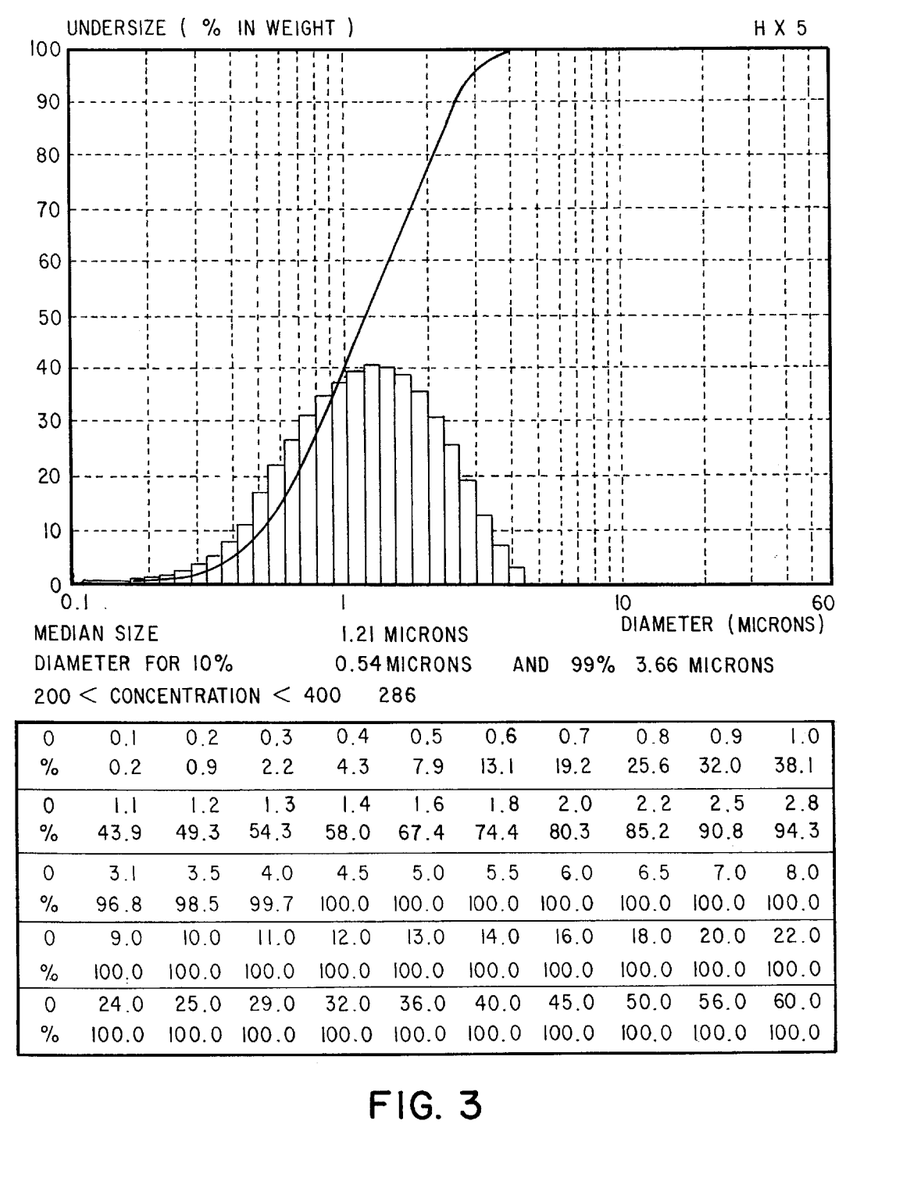
FIG. 3 is another chart illustrating particle size distribution.

FIGS. 1 through 3 illustrate particle-size distributions typical of both fractions, with FIGS. 2 and 3 representing two versions with particularly fine articles.

How the two fractions are prepared will now be specified.

1.1. Preparing Fraction 1

A bottom grit in the form of molten glass released from a bottom outlet and allowed to cool in water is ground dry or with only a little water for several hours in a ball mill comprising a bowl of hard porcelain and balls of $Al_2O_3$. The portion consisting of particles measuring less than 63 μm is the Fraction 1. The parameters employed in the milling process (volume, balls to starting-material ratio, and milling time) are selected to ensure a range as close to that listed in FIG. 1 as possible. In the concrete example the ratio of balls to starting material was 2:1 and the milling time 10 hours.

1.2. Preparing Fraction 2

Glass powder sifted through a 100 μm screen out of a bottom grit obtained from a bottom outlet and preliminarily ground dry in a ball mill of the same type is further ground in a ball mill comprising a bowl lined with hard plastic and a stirrer with a mixture comprising 90% water and 10% isopropanol by weight. The balls are $Al_2O_3$ and approximately 0.6–1 mm in diameter. The milling is carried out in cycles for 5 hours. The suspension is gently freeze-dried into the Fraction 2 (<7 μm) to be combined with Fraction 1 into the slurry.

1.3. Mixing the Slurry

A glass powder comprising 75% Fraction 1 (<63 μm) and 25% Fraction 2 (<7 μm) is weighed out with completely demineralized water at a ratio of 80:20 by weight and homogenized in a hard-porcelain roller mill with $Al_2O_3$ rollers (10 mm in diameter and 10 mm long) for several (approximately 20) hours. The following properties of the milled slurry were determined:

particle-size distribution (by laser granulometry), density (weight per liter), temperature, pH, water content (moisture), electrical conductivity, pour-out rate (of 25 ml of slurry from a standardized burette) or viscosity (with a rotating viscometer).

Figure 4:
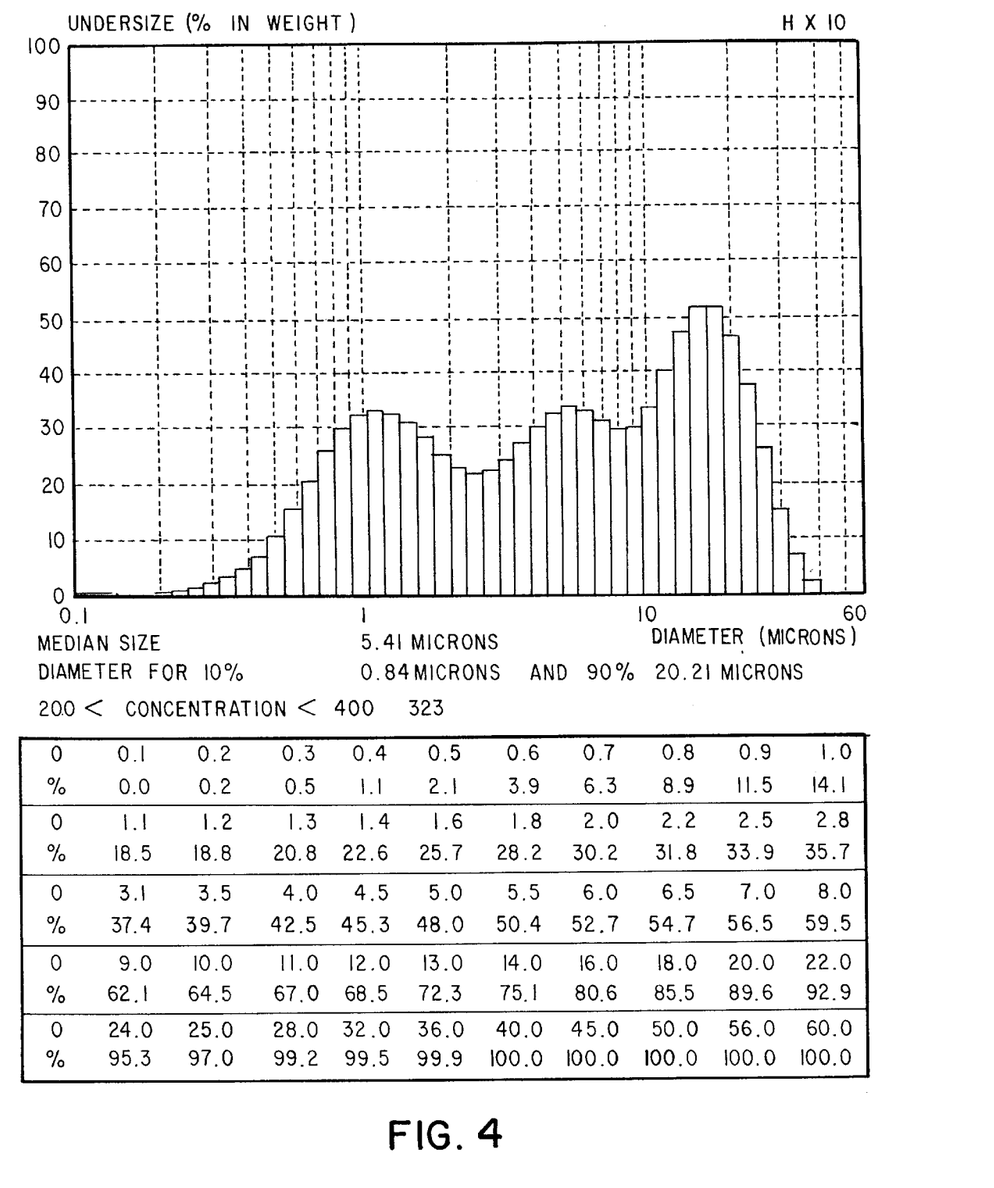
FIG. 4 is another chart illustrating particle size distribution.

FIG. 4 illustrates a particle-size distribution typical of such a slurry. Based on previous experience with the relationship between empirically determined properties and the pouring behavior and/or body of the slurry, the values listed in FIGS. 1 through 4 and in the table are employed as criteria for evaluating the slurry. These criteria have proven to ensure good results.

2. Casting 2.1. Preparing the Plaster Cast

The new casts can be dried at 40° C. before being used for the first time. The inner surfaces of the casts are wiped out with a paper towel soaked in alcohol before the cast is first used. They can then be allowed to stand full of completely demineralized water for 15 minutes.

2.2. Casting, Decasting, Cleaning, and Drying

The water is poured out and the cast filled with slurry. The thickness of the casing wall is monitored during bodying. Bodying should take approximately 10–15 minutes to attain the desired thickness, of approximately 3 mm for example. Once the wall is thick enough, the rest of the slurry is poured back into the roller mill and re-milled to prevent the particles from setting.

Subsequent to repouring, the bodies are allowed to contract in the cast for 10–15 minutes if intended for pans and bowls up to 100 mm in diameter and for up to 30 minutes if larger. They are then decasted, usually just by turning the cast upside down, otherwise by a very gentle introduction of air from a compressed-air gun.

The castings are cleaned with a moist natural or synthetic sponge immediately after decasting and dried to constant weight at room temperature to 110° C.

3. Biscuiting

The dry castings are biscuit-fired in an electric or gas-heated kiln 1 hour at 300K/h and 500° C. and another hour at 300K/h and 600° C.

The firing support employed with larger hollow containers (those with a diameter longer than 100 mm) must be ground perfectly flat. It can also be of advantage to shield (muffle) the green compacts from the direct radiation of the heating element or gas flame.

4. Glazing 4.1. Preparing the Glaze

The starting material is the powdered-glass Fraction 2 sifted to 5 μm.

The powder is weighed out 50:50 by weight with completely demineralized water. The mixture is homogenized in a mill with a hard-porcelain drum and $Al_2O_3$ rollers (10 mm in diameter and 10 mm long) for at least 20 hours (the ratio of suspension to rollers being 2:1 by weight).

4.2. Glazing

The hollow containers preliminarily fired at 600° C. are immersed, before glazing, in completely demineralized water for approximately 15–25 seconds to diminish any capillary suction remaining in the still very porous body. The excess water is drained off and a coating of glaze is applied by immersing the body in the glaze prepared as described in 4.1. The excess glaze is drained off by positioning the hollow containers with as many surfaces aslant as possible. Sponge cloth is applied to all points of contact or support to prevent the glaze from peaking as it dries.

Once the coating has dried to the extent that the hollow containers can be touched without damaging the glaze, they are dried in a drier for 6 hours at 40° C. and for another 6 hours at 110° C.

5. Firing (Sharp Firing or Glaze Baking)

The glaze-coated and dried hollow containers are then fired in accordance with the following sequence of sintering temperatures:

| | | |
|---|---|---|
| 300 K/h | 500° C. | 1 hour |
| 180 K/h | 750° C. | 0 hour |
| 60 K/h | 815° C. | 1 hour |
| 180 K/h | 1150° C. | 1 hour |
| 120 K/h | RT | |

If vitreous material is used and HQMK is to be created as the main crystal phase, the sintering process ends at 900° C.

EXAMPLE 2

The process is similar to the process described in Example 1, with the following modifications:

During the preparation of grin fraction 2, pure demineralized water is used as the grinding fluid. The suspension is not dried, but after a corresponding calculation of the ingredients so that there is a solids content of 80% and the grain fraction <7 μm reaches a level of 25%, is used directly as a component of the casting slurry described in 1.3.

The advantages of the invention are:

Manufacture of complex geometries which cannot be obtained by hot shaping of glass/glass-ceramics Manufacture of glass ceramics without nucleation agents (in this case, the grain boundaries act as nuclei)

Manufacture of glass-ceramics without refining agents

Use of recycled glass and/or glass-ceramics

Flexibility in the individual shaping of items from small batches up to mass production Ability to realize relief-like surfaces Composites can be manufactured simply by adding additional, in particular metallic components or, for example, a decorative marbling can be created, in particular by the admixture of pigments Self-stabilizing slurrys can be produced with a high solids content and low drying shrinkage without adding either plastics or other organic or inorganic substances.

The high green density, of more than 70% for example, and the outstanding dimensional stability and strength of the casting allows dense sintering in the HQMC range, resulting in a very low sintering contraction accompanied by a very small heat-expansion coefficient on the part of the finished article.

The casting process can be controlled to produce stratification.

We claim:

1. A method of producing a dense-sintered glass-ceramic shaped object having a heat-expansion coefficient, α, of $-0.5 \times 10^{-6}/K$ to $1.8 \times 10^{-6}/K$ in the temperature range of 20° to 700° C., comprising:

slurry casting a material, the material being at least one material selected from the group consisting of fine ceramizable glass powder and glass ceramic from the $Li_2O-Al_2O_3-SiO_2$ system, into a green compact by means of a porous cast;

drying, sintering, and ceramizing the slurry cast material at temperatures of 700° C. or higher until a sintering temperature and relative densities greater than 0.96 are obtained;

wherein the material is prepared in two fractions, the first fraction consisting of at least 90% of particles less than 63 μm in size and the second fraction consisting of particles less than 7 μm in size, and wherein the fractions are then combined in a ratio of 2:1 to 4:1 and added to water to form a stable, pourable slurry with a solids content of up to 85%.

2. The method of claim 1, wherein the material has a composition in the range of:

$Li_2O$: 2.0–6.0% (in wt. % of oxides) of $Na_2O$: 0.0–4.0

$K_2O$: 0.0–4.0

$\Sigma Na_2O+K_2O$: 0.0–4.0

$MgO$: 0.0–3.0

$ZnO$: 0.0–4.0

$CaO$: 0.0–1.0

$SrO$: 0.0–2.0

$BaO$: 0.0–3.5

$Al_2O_3$: 17.0–28.0

$SiO_2$: 50.0–75.0

$TiO_2$: 0.0–7.0

$ZrO_2$: 0.0–3.5

$SnO_2$: 0.0–2.0

$\Sigma TiO_2+ZrO_2+SnO_2$: 2.0–7.0

$P_2O_5$: 0.0–8.0 and at least one coloring component selected from the group consisting of $V_2O_5$ 0–2.0, $Cr_2O_3$ 0–30, $MnO_2$ 0–2.0, $Fe_2O_3$ 0–2.0, $CoO$ 0–2.0, and $NiO$ 2.0.

3. The method of claim 1, wherein a crystal phase in the form of high-quartz mixed crystals (HQMC) is created with a glass ceramic sintered at up to 900° C. and with a heat-expansion coefficient, α, of $0.0\pm0.5\times10^{-6}$/K at 20 to 700° C.

4. The method of claim 1, in wherein a crystal phase in the form of keatite mixed crystals is created with a glass ceramic sintered at up to 1200° C. and with a heat-expansion coefficient, α, of $0.0\pm0.5\times10^{-6}$/K to $1.8\times10^{-6}$/K at 20 to 700° C.

5. The method of claim 1, wherein up to 100% of the portion of the material in the first fraction consisting of at least 90% of particles less than 63 μm in size is replaced with an already ceramized powder with the same range of chemical composition.

6. The method of claim 5, wherein crystal phases in the form of high-quartz and keatite mixed crystals are created in the sintered glass ceramic.

7. The method of claim 1, wherein up to 100% of the portion of the material in the second fraction consisting of particles less than 7 μm in size is replaced with an already ceramized powder.

8. The method of claim 1, wherein the fractions are milled prior to forming the slurry.

9. The method of claim 1, wherein the water content of the slurry is reduced to less than 23% prior to casting.

10. The method according to claim 9, wherein the water content of the slurry is reduced to 17.5–18.5% prior to casting.

11. The method of claim 1, wherein a third component is mixed into the slurry.

12. The method of claim 11, wherein the third component is homogeneously distributed throughout the slurry.

13. The method of claim 12, wherein the third component is added to at least one material.

14. The method of claim 11, wherein the third component is added at 0–50% by weight relative to the dried, sintered, and ceramized compact.

15. The method according to claim 11, wherein the third component comprises at least one component selected from the group consisting of a metal and a metal-containing component.

16. The method according to claim 15, wherein the third component comprises a pigment.

17. A method of producing dense-sintered glass-ceramic shaped object having a heat-expansion coefficient, α, of $-0.5\times10^{-6}$/K to $1.8\times10^{-6}$/K in the temperature range of 20° to 700° C. comprising:

slurry casting a material, the material being at least one material selected from the group consisting of fine ceramizable glass powder and glass ceramic from the $Li_2O-Al_2O_3-SiO_2$ system, into a green compact by means of a porous cast;

drying sintering, and ceramizing the slurry cast material at temperatures of 700° C. or higher until a sintering temperature and relative densities greater than 0.96 are obtained;

wherein the material is prepared in two fractions, the first fraction consisting of at least 90% of articles less than 63 μm in size and the second fraction consisting of particles less than 7 μm in size, wherein the fractions are then combined in a ratio of 2:1 to 4:1 and added to water to form a stable, pourable slurry with a solids content of up to 85%; and wherein the green compact is tempered at up to 600° C. subsequent to drying and prior to performing at least one operation selected from the group consisting of sintering and ceramizing, followed by glazing with a glazing slurry.

18. A method of producing a dense-sintered glass-ceramic shaped object having a heat-expansion coefficient, α, of $-0.5\times10^{-6}$/K to $1.8\times10^{-6}$/K in the temperature range of 20° to 700° C. comprising:

slurry casting a material, the material being at least one material selected from the group consisting of fine ceramizable glass powder and glass ceramic from the $Li_2O-Al_2O_3$ system, into a green compact by means of a porous cast;

drying, sintering, and ceramizing the slurry cast material at temperatures of 700° C. or higher until a sintering temperature and relative densities greater than 0.96 are obtained:

wherein the material is prepared in two fractions, the first fraction consisting of at least 90% of particles less than 63 μm in size and the second fraction consisting of particles less than 7 μm in size, wherein the fractions are then combined in a ratio of 2:1 to 4:1 and added to water to form a stable, pourable slurry with a solids content of up to 85%; and wherein the slurry is prepared by wet-milling at least one of the fractions, the slurry preparation comprising:

drying the same fraction; and subsequently adding the dried fraction to the other fraction.

19. The method according to claim 18, wherein at least one wet-milled fraction comprises particles less than 7 μm in size.

20. The method according to claim 18, the wherein drying comprises freeze-drying step.

21. A method of producing a dense-sintered glass ceramic shaped objects having a heat-expansion coefficient, α, of $-0.5\times10^{-6}$/K to $1.8\times10^{-6}$/K in the temperature range of 20° to 700° C. comprising:

slurry casting a material, the material being at least one material selected from the group consisting of fine ceramizable glass powder and glass ceramic from the $Li_2O-Al_2O_3-SiO_2$ system, into a green compact by means of a porous cast.

drying sintering, and ceramizing the slurry cast material at temperatures of 700° C. or higher until a sintering temperature and relative densities greater than 0.96 are obtained;

wherein the material is prepared in two fractions, the first fraction consisting of at least 90% of particles less than 63 μm in size and the second fraction consisting of particles less than 7 μm in size, wherein the fractions are then combined in a ratio of 2:1 to 4:1 and added to water to form a stable, pourable slurry with a solids content of up to 85%;

wherein a glazing slurry is applied to the compact; and wherein the glazing slurry includes a wet-milled and subsequently dried powder having particles smaller than 5 μm and demineralized water in a ratio of 50 to 50 by weight.

22. A method of producing a dense-sintered glass ceramic shaped object having a heat-expansion coefficient, α, of $-0.5\times10-6$/K to $1.8\times10^{-6}$K in the temperature range of 20° to 700° C., comprising:

slurry casting a material, the material being at least one material selected from the group consisting of fine ceramizable glass powder and glass ceramic from the $Li_2O-Al_2O-SiO_2$ system, into a green compact by means of a porous cast;

drying, sintering, and ceramizing the slurry cast material at temperatures of 700° C. or higher until a sintering temperature and relative densities greater than 0.96 are obtained:

wherein the material is prepared in two fractions, the first fraction consisting of at least 90% of particles less than 63 μm in size and the second fraction consisting of particles less than 7 μm in size, wherein the fractions are then combined in a ratio of 2:1 to 4:1 and added to water to form a stable, pourable slurry with a solids content of up to 85%;

wherein the compact is subjected to a series of firings whereby it is heated from room temperature to 500° C. at approximately 5K per minute, maintained at that temperature approximately 60 minutes, heated to 750° C. at 1–5K per minute, immediately heated to 815° C. at 0.5–1K per minute, maintained at that temperature approximately 60 minutes, heated to 1200° C. at 3–5K per minute, and maintained at that temperature approximately 60 minutes, followed by sintering and thorough ceramization.

23. A method of producing a dense-sintered glass-ceramic shaped object having a heat-expansion coefficient, α, $-0.5 \times 10^{-6}$K to $1.8 \times 10^{-6}$/K in the temperature range of 20° to 700° C. comprising:

slurry casting a material, the material being at least one material selected from the group consisting of fine ceramizable glass powder and glass ceramic from the $Li_2O\text{-}Al_2O_3\text{-}SiO_2$ system, into a green compact by means of a porous cast;

drying, sintering, and ceramizing the slurry cast material at temperatures of 700° C. or higher until a sintering temperature and relative densities greater than 0.96 are obtained;

wherein the material is prepared in two fractions, the first fraction consisting of at least 90% of particles less than 63 μm in size and the second fraction consisting of particles less than 7 μm in size, wherein the fractions are then combined in a ratio of 2:1 to 4:1 and added to water to form a stable, pourable slurry with a solids content of up to 85%;

wherein the compact is pre-tempered and pre-glazed followed by sintering and thorough ceramization.

24. A method of producing a dense-sintered glass-ceramic shaped object having a heat-expansion coefficient, α, of $-0.5 \times 10^{-6}$/K to $1.8 \times 10^{-6}$/K in the temperature range of 20° to 700° C. comprising:

slurry casting a material, the material being at least one material selected from the group consisting of fine ceramizable glass powder and glass ceramic from the $Li_2O\text{-}Al_2O_3\text{-}SiO_2$ system, into a green compact by means of a porous cast;

drying, sintering, and ceramizing the slurry cast material at temperatures of 700° C. or higher until a sintering temperature and relative densities greater than 0.96 are obtained;

wherein the material is prepared in two fractions, the first fraction consisting of at least 90% of particles less than 63 μm in size and the second fraction consisting of particles less than 7 μm in size, wherein the fractions are then combined in a ratio of 2:1 to 4:1 and added to water to form a stable, pourable slurry with a solids content of up to 85%;

wherein the compact is rendered in at least one form selected from the group consisting of inhomogeneous, laminar, and stratiform, the rendering including directly adding the third component to only a portion of the slurry.

* * * * *